United States Patent
Selander et al.

(10) Patent No.: US 8,934,892 B2
(45) Date of Patent: Jan. 13, 2015

(54) METHODS AND ARRANGEMENTS FOR DIRECT MODE COMMUNICATION

(75) Inventors: Göran Selander, Bromma (SE); Konstantinos Dimou, Stockholm (SE); Johan Lundsjö, Spånga (SE); Micael Martell, Kungsbacka (SE); Gunnar Mildh, Sollentuna (SE); Mats Näslund, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 5 days.

(21) Appl. No.: 13/703,677

(22) PCT Filed: Jun. 22, 2010

(86) PCT No.: PCT/SE2010/050708
§ 371 (c)(1),
(2), (4) Date: Dec. 12, 2012

(87) PCT Pub. No.: WO2011/162649
PCT Pub. Date: Dec. 29, 2011

(65) Prior Publication Data
US 2013/0084854 A1    Apr. 4, 2013

(51) Int. Cl.
*H04W 4/00* (2009.01)
*H04W 76/02* (2009.01)

(52) U.S. Cl.
CPC ............ *H04W 4/008* (2013.01); *H04W 76/023* (2013.01)
USPC ........ 455/426.1; 455/41.2; 455/444; 370/328

(58) Field of Classification Search
USPC ...................... 455/426.1, 41.2, 444; 370/328
See application file for complete search history.

(56) References Cited

U.S. PATENT DOCUMENTS

2007/0008922 A1 * 1/2007 Abhishek et al. ............. 370/329
2007/0189249 A1 * 8/2007 Gurevich et al. ............. 370/338
(Continued)

FOREIGN PATENT DOCUMENTS

| EP | 1998499 A1 | 3/2008 | |
|---|---|---|---|
| FR | 1843543 | * 4/2006 | ............. H04L 29/06 |

(Continued)

OTHER PUBLICATIONS

Doppler. "Device-to-Device Communication as an Underlay to LTE-Advanced Networks." IEEE Communication Magazine, Dec. 2009, pp. 42-49.

(Continued)

*Primary Examiner* — Kamran Afshar
*Assistant Examiner* — Mong-Thuy Tran
(74) *Attorney, Agent, or Firm* — Coats & Bennett, P.L.L.C.

(57) ABSTRACT

A method in a first user equipment (UE 1) connectable to a second user equipment (UE 2) via a communication network or via a direct radio communication link, of using a direct radio communication link for communication between the UEs is initiated when one of the UEs receives probe signaling information comprising a first probe token via the communication network. The UEs exchange probe signaling messages including a second and/or the first probe token at least partly according to the probe signaling information, such that one of the UEs can compare the probe tokens, generate a probing report and provide the probing report to the communication network, or to the opposite UE for evaluation in case of a successful comparison and such that a direct radio communication link can be used for communication with UE 2 in response to receiving instructions to use the second direct radio communication link from the entity by which the probing report was evaluated.

35 Claims, 11 Drawing Sheets

(56) References Cited

U.S. PATENT DOCUMENTS

| | | | |
|---|---|---|---|
| 2009/0168689 A1* | 7/2009 | Itagaki et al. | 370/315 |
| 2009/0303934 A1* | 12/2009 | Abhishek et al. | 370/328 |
| 2010/0128701 A1* | 5/2010 | Nagaraja | 370/338 |
| 2010/0278120 A1* | 11/2010 | Haddad et al. | 370/329 |
| 2011/0103264 A1* | 5/2011 | Wentink | 370/255 |
| 2011/0252146 A1* | 10/2011 | Santamaria et al. | 709/227 |
| 2011/0287794 A1* | 11/2011 | Koskela et al. | 455/509 |
| 2013/0150051 A1* | 6/2013 | Van Phan et al. | 455/437 |

FOREIGN PATENT DOCUMENTS

| | | |
|---|---|---|
| WO | 9904514 A1 | 1/1999 |
| WO | 2006119281 A2 | 11/2006 |

OTHER PUBLICATIONS

3rd Generation Partnership Project. Technical Specification Group Services and System Aspects; 3GPP System Architecture Evolution (SAE); Security architecture (Release 9). 3GPP TS 33.401 V9.4.3, Jun. 2010.

* cited by examiner

METHODS AND ARRANGEMENTS FOR DIRECT MODE COMMUNICATION

TECHNICAL FIELD

The present invention relates generally to methods and arrangements for enabling user equipments to communicate via a direct radio communication link.

BACKGROUND

Two user equipments (UEs), such as e.g. mobile phones or laptops that are communicating using some kind of wide area access technology, such as e.g. a technology based on Long Term Evolution (LTE) or Ethernet are typically also capable of establishing communication via a common "short range" communication technology, such as e.g. Bluetooth, a special LTE "direct mode" or a Wireless Local Area Network (WLAN). In case the two UEs are located geographically close to each other, i.e. within radio range, it may be more beneficial to enable direct terminal-to-terminal communication using the mentioned short range communication interface, than to continue to communicate via the wide area access technology. By providing the option to use direct mode communication whenever the conditions are favorable enough, the network currently serving the UEs may be off-loaded, which may lead to the user getting lower charging and/or the UEs may obtain a higher bandwidth and/or a lower battery consumption.

The wide area access technology may typically be an LTE Radio Access Network (RAN) connected to 3GPP EPS, where the communication services are based on IMS, or any other type of suitable realization. The common short range technology may typically be a specially developed "LTE direct mode", or, WLAN, but also other short range technologies may be used.

The TETRA system can start a direct mode session on user request. This is thus from networking point of view a completely new session and not a handover of an existing one.

In known use cases, two users may in general not be aware that they are close to each other. Even the network may be unaware of the fact that the UEs are located close to each other since the users may be subscribers of different operators. Conversely, even if the users are aware of their mutual close locations it is not obvious that switching from a network connection to a direct mode is beneficial, e.g. the radio conditions or charging conditions may still be unfavorable.

In addition, there are user privacy problems by using beacons with global and/or traceable identifiers, such as WLAN BSSID/SSID or Bluetooth Device Name.

SUMMARY

The object of the present disclosure is to address at least some of the problems outlined above. In particular, it is an object of the present disclosure to provide a solution for determining whether a direct radio communication link is to be preferred for two UEs rather than a communication via a communication network. In order to achieve such this methods and arrangements for executing the suggested methods are provided.

According to one aspect a method of using a direct radio communication link for communication between a first and a second user equipment is provided, where the method is executable in the first user equipment, which is connectable to the second user equipment via a communication network or via a direct radio communication link.

According to one embodiment, the first user equipment is transmitting probe signaling information comprising a first probe token to the second user equipment, via the communication network after which it is exchanging probe signaling messages including a second and/or the first probe token with the second user equipment over said first direct radio communication link, at least partly according to the probe signaling information. The exchange of such information will enable the first or the second user equipment to compare the first and the second probe token, to generate a probing report and to evaluate the probing report, or to provide the probing report to a node of the communication network or to the opposite user equipment for evaluation in case of a successful comparison, wherein the probing report is, at least partially, based on content exchanged via the probe signaling messages. Once instructions to use a second direct radio communication link for communication with the second user equipment has been obtained from the entity by which the probing report was evaluated, the first user equipment can use the second direct radio communication link.

According to one embodiment, the first probe token may be provided to the second user equipment together with probe signaling information while the second probe token may be provided to the second user equipment during the probe signaling exchange.

According to another embodiment the first user equipment is providing a second probe token, such that it is made available for later processing by the first user equipment, and receiving the first probe token, which is thus being returned, from the second user equipment. Once both probe tokens are available to the first user equipment it compares the first and the second probe tokens, and, in case of a successful comparison, a probing report is generated. The probing report is transmitted to the network node, after which an instruction is received from the network node, instructing the first user equipment to use the second direct radio communication link for communication with the opposite user equipment, in case the evaluation of the probing report approves the use of such a communication link.

According to another embodiment the first user equipment is providing a second probe token, such that it is made available for later processing by the first user equipment, and receiving the first probe token from the second user equipment, and the first and the second probe tokens are compared. Once both probe tokens are available to the first user equipment it compares the first and the second probe tokens, and, in case of a successful comparison, a probing report is generated and evaluated by the first user equipment. In case the evaluation of the probing report approves the use of such a communication link the first user equipment transmits an instruction to the second user equipment, instructing it to use the second direct radio communication link for communication with the opposite user equipment.

According to another aspect, another method which is to be executed in a first user equipment connectable to a second user equipment via a communication network or via a direct radio communication link, is provided. According to this method probe signaling information comprising a first probe token is received by the first user equipment via the communication network Probe signaling messages including the first and/or a second probe token are then exchanged with the second user equipment over a first direct radio communication link, at least partly according to the probe signaling information. The information exchange enables for the first or the second user equipment to compare the first and the second probe token, to generate a probing report and to provide the probing report to a node of the communication network, or to the opposite user equipment for evaluation in case of a successful comparison, wherein the probing report is, at least partially, based on content exchanged via the probe signaling messages. The first user equipment will then be able to use a second direct radio communication link for communication with the second user equipment in response to receiving instructions to use the second direct radio communication link from the entity by which the probing report was evaluated.

An advantage with particular embodiments is that one of two user equipments may use a communication network and a first direct radio communication link to determine whether a direct communication link, which may be the first link or another link, is to be preferred before communicating via the communication network, without requiring any interaction from the users.

Another advantage with particular embodiments is that the use of probe tokens verifies that the first user equipment is communicating with an expected second user equipment, or vice versa.

Yet another advantage of particular embodiments is that one of the user equipment can initiate measurements for determining whether a direct radio communication link is to be used by the two user equipments.

The probe signaling information may comprise instructions for at least one of said first and second user equipment, on how to handle one or more probe tokens. These instructions may e.g. instruct a user equipment to listen for a first or a second probe token, to transmit a first or a second probe token to the opposite user equipment according to acquired probe signaling information and/or to transmit at least a part of the signaling information to the opposite user equipment.

In case the user equipment is configured to determine the outcome of an initiated probing process, the user equipment may be configured to evaluate a probing report received from the opposite user equipment and to provide an instruction to the user equipment from which the probing report was received, instructing it to use the second direct radio communication link for communication with the opposite user equipment, in case the evaluation of the probing report approves the use of such a communication link.

According to another aspect, a method executable in a network node of a communication network capable of supporting establishment of a direct radio communication link between a first user equipment and a second user equipment, is provided. According to this method, the network node transmits a first set of probe signaling information (PSI 1) comprising a first probe token to the first or second user equipment, and a second set of probe signaling information (PSI 2), comprising a second probe token to the opposite user equipment, The transfer of probe signaling information to the user equipments enables for the first and the second user equipments to exchange probe signaling messages, including the first and/or the second probe token over the first direct radio communication link, at least partially according to the probe signaling information, and for at least one of the first and the second user equipment to compare the probe tokens, to generate a probing report which, at least partially, is based on content exchanged via the probe signaling messages in case of a successful comparison, and to provide the probing report to the network node or to the opposite user equipment for evaluation. After such an evaluation, the first and the second user equipment can use a second direct radio communication link for communication between the two user equipments in response to receiving instructions to use the second direct radio communication link from the entity by which the probing report was evaluated.

According to one embodiment the probing report may be received from the first or the second user equipment, after which it is evaluated by the network node and, in case the evaluation of the probing report support the use of such a communication link, instructions are provided to at least one of the first and the second user equipment, instructing the respective user equipment(s) to use the second direct radio communication link for communication with the opposite user equipment.

In order to trigger a probing process, such as one of the described by the methods suggested above, initial triggering steps may be executed. Such a process may comprise the acquiring of distance related information giving an estimated distance between the first and the second user equipment, and a triggering of the transmission of the probe signaling information in case the estimated distance is less than a pre-defined maximum distance.

In addition to considering the relative distance between the two user equipments, at least one additional criterion for transmitting probe signaling information to one or both of said first and second user equipments may be determined. If, the required criteria is fulfilled, a transmission of the probe signaling information is triggered.

Such triggering may e.g. be dependent on the type of service provided to the first and/or second user equipment.

According to one embodiment, the transmission of the probe signaling information is triggered in case it is determined that the required criteria is fulfilled during session setup between the first and the second user equipments.

According to another embodiment the transmission of the probe signaling information is triggered in case it is determined that required criteria is fulfilled during an ongoing session between the first and the second user equipment via the communication network, such that a handover from said communication network to said second direct radio communication link is initiated in case said probing report is favorable.

An advantage with both embodiments suggested above is that the triggering is not executed before the set-up of a communication, but during, or subsequent to the set-up, thereby enabling a more dynamic selection or a direct radio communication link.

The probing report may comprise at least one quality measure indicative of the quality of the first direct radio communication link, which can be taken into consideration when determining whether the use of a direct radio communication link is to be preferred. More specifically the probing report may comprise at least one of: an indication of the signal strength received from the opposite user equipment by the entity from which the probing report was transmitted; an indication of the power received from the opposite user equipment by the entity from which the probing report was transmitted; an estimate of the signal to noise ratio experienced by the entity from which the probing report was transmitted; an indication of the interference experienced by the entity from which the probing report was transmitted, and an estimate of the pathloss between said user equipments.

At least one of the probe tokens may comprise a randomly or pseudo-randomly generated bit string.

The radio spectrum of the first and/or the second direct communication link may be any of an unlicensed radio spectrum or a licensed radio spectrum.

Furthermore, at least part of said probe signaling information may be transmitted via an application layer signaling protocol, wherein the application layer signaling protocol may be the Session Initiation Protocol, SIP.

A comparison of probe tokens may be considered successful if the first probe token is identical to the second token or in case the first token is an expected function of the second token, or vice versa.

Furthermore, the method steps suggested above may be repeated at a certain interval, thereby enabling a continuous evaluation of the conditions for changing to a direct radio communication link.

According to another aspect a first user equipment (UE 1) suitable for executing any of the methods described above is provided. UE 1, which is connectable to a second user equipment (UE 2) via a communication network or via a direct radio communication link, comprises a communication unit configured to receive probe signaling information comprising a first probe token, via a network node of the communication network. UE 1 also comprises a probe handing unit, configured to exchange probe signaling messages, including a second and/or said first probe token, with the second user equipment (UE 2) over a first direct radio communication link, at least partly according to said probe signaling information. Such exchange enables at least one of the first (UE 1) and the second user equipment (UE 2) to compare the first and the second probe token; to generate a probing report and to evaluate the probing report or to provide said probing report to a node of the communication network, or to the opposite user equipment for evaluation, in case of a successful comparison, where the probing report is, at least partially, based on content exchanged via said probe signaling messages. The communication unit is further configured to use a second direct radio communication link, which may be the first direct radio communication link, for communication with the second user equipment according to instructions provided from the entity by which the probing report was evaluated.

The probe handling unit may be configured to consider the comparison as successful in case the first probe token is identical to the second probe token, or the first probe token is derived as an expected function of the second probe token, or vice versa.

UE 1 may also comprise a probing unit configured to generate the probe signaling information, and to provide the generated probe signaling information to the second user equipment (UE 2). The probing unit may also be configured to transmit the probe signaling information, to the second user equipment (UE 2), via the communication unit and the network node.

The first user equipment typically also comprises a probing triggering unit which is configured to trigger the probing unit to transmit probe signaling information to the second user equipment (UE 2) via the communication unit when one or more trigger criteria has been fulfilled. The probing triggering unit may be configured to acquire an estimate of a distance between the first (UE 1) and the second user equipment (UE 2) and to trigger the transmission of probe signaling information in case the estimated distance is less than a pre-defined maximum distance. IN addition, the probing triggering unit may be configured to determine whether at least one additional criterion for transmitting probe signaling information to the second user equipment is fulfilled and to trigger the transmission of probe signaling information in case it is determined by the probing triggering unit that all required criteria is fulfilled.

According to yet another aspect, a network node of a communication network capable of supporting establishment of a direct radio communication link between a first user equipment (UE 1) and a second user equipment (UE 2) is provided, where such a network node comprises a probing unit configured to transmit a first set of probe signaling information comprising a first probe token to the first or second user equipment and a second set of probe signaling information comprising a second probe token to the opposite user equipment via a communication unit. Such a process will enable for the first (UE 1) and the second user equipment (UE 2) to exchange probe signaling messages including the first and/or said second probe token over the first direct radio communication link, at least partially, according to the probe signaling information, thereby enabling the first or the second user equipment to compare the received probe tokens; to generate a probing report which, at least partially, is based on content exchanged via the probe signaling messages in case of a successful comparison, and to provide the probing report to said network node or the opposite user equipment for evaluation, such that the first (UE 1) and the second user equipment (UE 2) can use a second direct radio communication link for communication in response to receiving, from the entity by which the probing report was evaluated, instructions to use the second direct radio communication link for communication between the two user equipments.

The network node may also comprise a probing triggering unit which is configured to trigger the communication unit to transmit probe signaling information to the second (UE 2) and first user equipment (UE 1) when one or more trigger criteria has been fulfilled. The probing triggering unit may also be configured to acquire an estimate of a distance between the first (UE 1) and the second user equipment (UE 2) and to trigger the transmission of probe signaling information in case the estimated distance is less than a maximum distance.

The probing triggering unit may be configured to determine whether at least one additional criterion for transmitting probe signaling information to the first (UE 1) and second user equipment (UE 2) is fulfilled and to trigger the transmission of probe signaling information in case the required criteria is fulfilled. Furthermore, the probing triggering unit may be configured to trigger the probing unit to transmit the probe signaling information repeatedly at a certain rate.

Further features of the methods and arrangements suggested above and its benefits can be understood from the detailed description below.

BRIEF DESCRIPTION OF THE DRAWINGS

The present invention will now be described in more detail by means of exemplary embodiments and with reference to the accompanying drawings, in which.

DETAILED DESCRIPTION

Figure 1A:
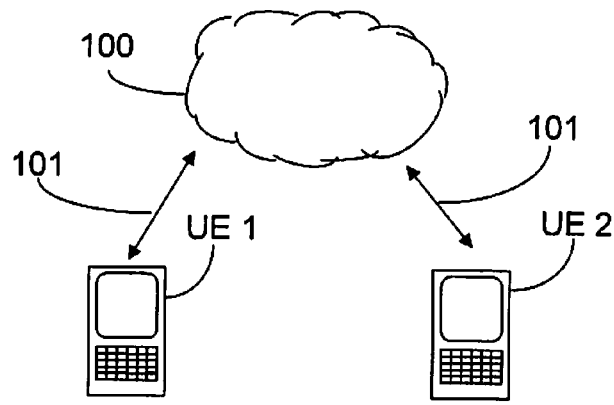
FIG. 1a-1c is a simplified series illustrating signaling sequences enabling execution of a probing process according to one exemplifying embodiment.

The present disclosure refers to methods and arrangements which allows for discovery and determination of seemingly favourable conditions for establishment of a direct radio communication link for communication between two UEs which initially communicates probe signaling information comprising probe tokens via a common communication network, from hereinafter referred to as a communication network. The direct radio communication link may be selected by executing a handover of an ongoing session, or it may be selected already during communication set-up. This process differs from known systems, such as e.g. TETRA, where a selection of a direct mode is done before set-up instead of during set-up. The suggested discovery process may be triggered when the UEs are in close vicinity of each other and may also depend on the type of service to be applied between the two UEs such that when the one or more pre-defined trigger criteria has been fulfilled, a probing process commence, wherein probe tokens are exchanged between UEs and radio conditions are measured and considered, such that the direct radio communication link is established for communication between the two UEs in case of a successful probing process.

More specifically, the probing process will be considered successful when probe tokens which have been compared to each other have a relationship which can be derived from instructions available to the UE which performs the comparison, and when an evaluation of a probing report turns out to be favorable. A comparison of probe tokens is considered to be successful when the compared probe tokens have a relationship in accordance with the derivable instructions. For example, said instructions may imply that the compared probe tokens should be identical, or that one probe token should be a pre-defined function of the other, in order for the comparison to be considered successful. A successful comparison may also be referred to as a favorable comparison.

Embodiments of the methods and arrangements will now be described in further detail below with reference to respective accompanying drawings. A first probe token may e.g. be a randomly or pseudo-randomly generated bit string which is identical to a second probe token, or which is a function of the second probe token. A probing process is considered successful if the function relating the probe tokens can be verified during a comparison of the probe tokens, and the measured radio conditions are favorable. The latter situation will result in a favorable probing report. An evaluation of a favorable probing report is intended to have a favorable result, i.e. be a favorable evaluation.

The communication network via which the probe signaling information is transmitted may apply an application layer signaling protocol, such as e.g. the Session Initiation Protocol (SIP) for this communication.

The radio spectrum of the direct communication link used for probing as a result of a successful probing process may be either an unlicensed radio spectrum or a licensed radio spectrum.

Figure 1B:
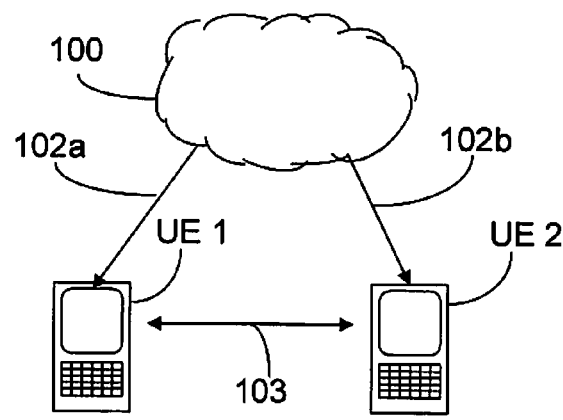
Figure 1C:
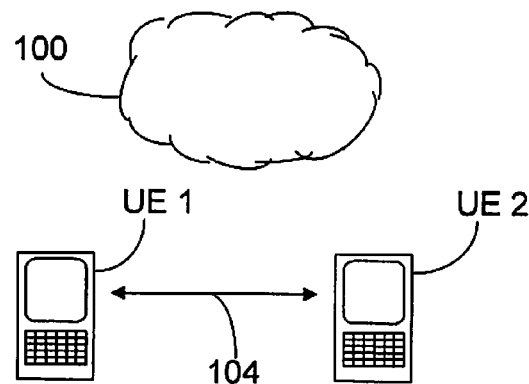

FIGS. 1*a*-1*c* describes such a discovery procedure in general terms, where figure 1a is an illustration of two UEs, UE 1 and UE 2 which have established a communication via a communication link 101, provided via a wide area or a common communication network 100.

As indicated in FIG. 1*b*, UE 1 is obtaining information, referred to as probe signaling information 102*a* which includes a first probe token via communication network 100, while UE 2 is obtaining another set of probe signaling information 102*b*, comprising a second probe token. The probe signaling information, sent to UE 1, including the probe token, may originate from a node in the network 100, as indicated in the figure, or from UE 2, or be a combination of information provided by these two entities. On the basis of the obtained probe signaling information, additional information exchange is executed by initiating probe signaling messages exchange 103 between the two UEs, where one or both probe tokens obtained via the probe signaling information is exchanged with the opposite UE, in this case UE 2, in association with the probe signaling message exchange. Instructions on how to execute the probe signaling messages exchange may, at least partially, be obtained via the probe signaling information. In addition to provide information from the probe signaling information, each UE may have preconfigured instructions stored, such that the probe signaling message exchange can be executed according to the obtained probe signaling information in combination with pre-stored UE and/or user specific instructions. In a simple case, information on how to execute the described discovery process may be stored in advance in the respective UEs. In such a case each set of probe signaling information may be restricted to only comprise respective probe token and an instruction or indication that the UE shall proceed according to the instructions stored at the UE.

The use of probe tokens enables one of the UEs to identify the other as a trusted party with which a direct radio communication link can be used for communication. In the present case UE 1, can compare the first probe token obtained via the communication network with a second probe token obtained from UE 2 in a probe signaling message. Based on the comparison of the two probe tokens a probing report is generated by UE 1 and provided to either UE 2, or to the communication network 100.

Based on an analysis of the probing report, which is made at the communication network 100 or in UE 2, depending on where the probing report was sent, a response is provided to one or both of the UE's. In the present case the probing report is sent to the communication network 100 which responds to UE 1 after having evaluated the probing report. If, as a result from the evaluation of the content of the probing report, it is found that use of a direct radio communication link is favorable for the two UE's the response sent to UE 1 will comprise instructions for UE 1 and UE 2 to set up and use a direct radio communication link 104, as indicated with FIG. 1*c*.

By repeating the described process at a pre-determined or dynamic interval, varying conditions for use of a direct radio communication link can be considered.

It is to be understood that direct radio communications 103 and 104 may be provided on the same communication link or may be separate links, where the first link is typically used for making link measurements, which can later be used in a probing report. One or more pre-defined criteria for applying direct mode communication by using direct radio communication link 104 has to be fulfilled in order to provide a positive response to the probing report, where evaluation of the pre-defined criteria may typically be based on data provided in the probing report.

It is also to be understood that although UE 1 and UE 2 are communicating via the same communication network 100, in the examples provided in this disclosure, the UEs may alternatively communicate via separate communication networks which are inter-connected in a conventional way.

FIG. 2-6 illustrates five different scenarios for initiating and executing what can be referred to as a discovery process, comprising a probing process. As a prerequisite for all five scenarios a first UE, UE 1 is initially engaged in a connection, or a set-up of a connection with another UE, UE 2 via a common communication network, represented by network node 200 in the figures. In the latter case the probing signaling information may arrive in signaling messages for connectivity establishment, which may result in a set-up of direct link or connectivity over the common communication network, depending on the result of the evaluation of the probing report. If not explicitly mentioned, the conditions for, and examples given in association with executing different steps in one embodiment mentioned below may be applicable also for the other embodiments.

Figure 2:
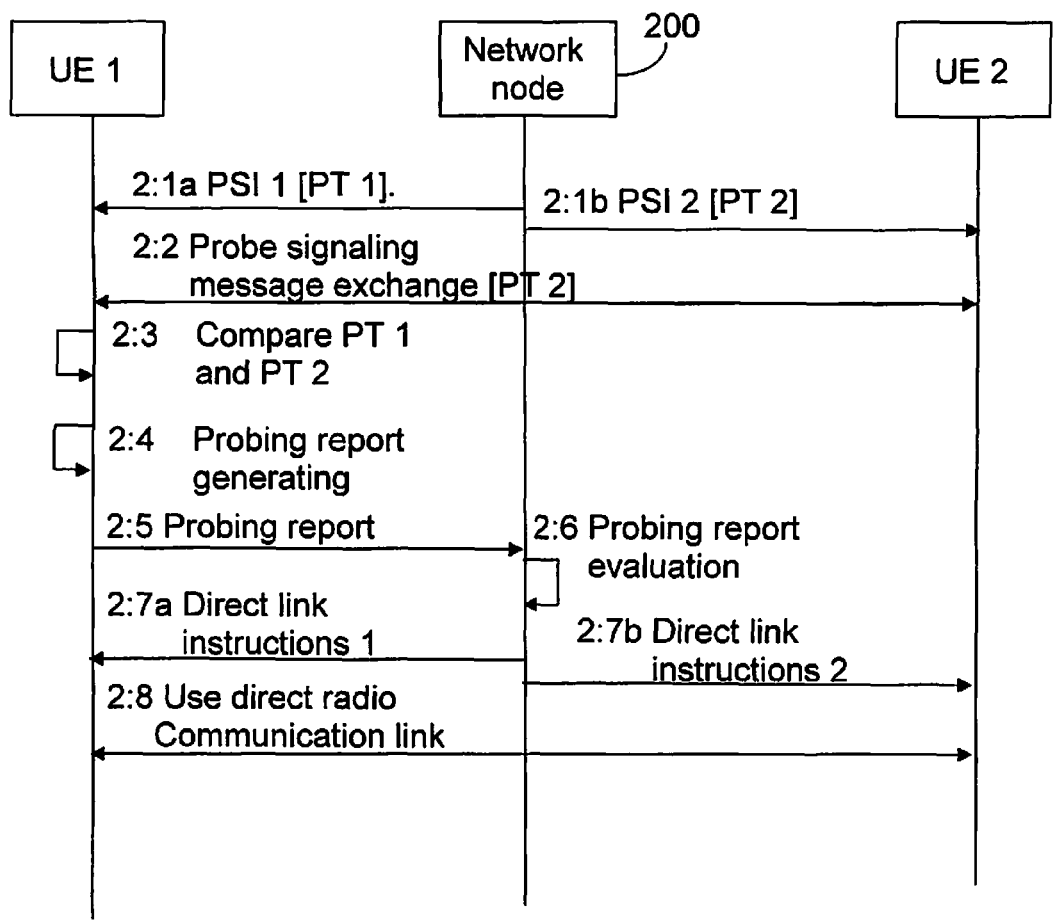
FIG. 2 is a signaling scheme illustrating signaling which enables probing according to a first exemplary embodiment.

Referring first to FIG. 2, UE 1 initially receives a first set of probe signaling information, PSI 1, comprising a first probe token PT 1. This first step is indicated as a step 2:1a in FIG. 2. In a corresponding way UE 2 is receiving a second set of probe signaling information, PSI 2, comprising a second probe token PT 2. As already mentioned above, it is to be understood that one or both of PSI 1 and PSI 2 may comprise only the respective probe token, while instructions necessary for handling the probe tokens accordingly may already be available at the respective UE.

In the present scenario the probe signaling information is provided from the network and network node 200, i.e. the probing process is triggered in the network. The probing process may be triggered by one or more trigger criteria. One basic criterion to consider is the distance between the two UEs, such that when the distance between the two UEs is less than a pre-defined maximum distance, which typically relates to the coverage of technique supporting the direct radio link, the probing process is triggered by transmitting probe signaling information 1 to UE 1. The distance between the two UEs may be estimated using any type of conventional distance measuring arrangement. In addition to estimating the distance between the UEs, the type of service or session, such as e.g. a request for making a file transfer, may be considered in order to determine whether a continuing communication via a direct radio communication link is to be preferred.

Subsequent to having received probe signaling information, UE 1 initiates an exchange of probe signaling messages with UE 2, according to instructions acquired in the probe signaling information or as previously determined between the parties and stored at the respective UE, or as a combination of both.

By way of example one of the UEs may be informed in the probe signaling information to listed for a specific token and how to continue the process once acquired, while the other UE may be instructed how to handle a probe token included in acquired probe signaling information.

In addition to instructions for the UE on how to continue the initiated process, the probe signaling information also comprises a probe token, having the purpose of enabling a UE being in possession of the probe token to compare the acquired probe token with another probe token received via another transmission channel or generated by the UE itself, such that the opposite UE can be identified as a trusted UE. More specifically, a UE, in the present case UE 1, which has received a first probe token PT 1, from, or via the communication network, compares the first probe token to a second probe token PT 2, received from the opposite UE, in the present case UE 2, as part of the probe signaling message exchange, as indicated with a step 2:2. It is to be understood that the probe signaling message exchange described in this and the subsequent scenarios may comprise one or more messages exchanged between the two UEs.

The probe tokens PT1 and PT2 used by the UEs for identification purpose are assumed to have a pre-determined relationship, e.g. the two probe tokens are identical, one is a specific function of the other, or a function of both will give a determined value during comparison. If the two probe tokens are considered to be related, i.e. they are found to have the pre-determined relationship after a comparison of the two probe tokens, executed in a step 2:3, UE 1 can consider the respective message from UE 2 as trustworthy and can continue the initiated process by generating a probing report, as indicate in another step 2:4.

The described probe token exchange may be executed in a number of alternative ways, such that either one or both of the UEs may exchange a respective probe token acquired via the common network via a direct radio communication link, thereby enabling one or both of the UEs to compare probe tokens. In case of a successful comparison, i.e. an expected relation between the two probe tokens can be verified, the receiving UE regards the sending UE as the intended sender and further processes the radio measurements made according to probe signaling instructions, the process can continue, while the probing process is interrupted or aborted in case no probing token entailing a successful comparison can be detected while following the probe signaling instructions.

The probing report will serve as a final verification of the ongoing probing process, such that the UE which is generating the probing report, in the present example UE1, may use at least some information obtained in the exchanged probe signaling messages and optionally also additional information which may indicate whether direct mode communication is to be preferred under the present circumstances. Radio condition measurements will in a basic scenario result in the determination of the distance between the UEs, i.e. if the UEs are close enough for using a direct radio communication link the UEs will be instructed to use such a communication link. In addition, the radio condition measurements may comprise one or more of the signal strength, signal to noise ratio, path loss or the interference experienced by the UE generating the probing report when communicating with the opposite UE, or the power received by the same UE from the opposite UE are measures that may be considered.

In a next step 2:5 the probing report is transmitted to the network node 200, where it is evaluated, as indicated in another step 2:6. At this stage information obtained in the probing report may be used in combination with other conditional instructions available at the network node 200, for determining whether a direct radio communication link should be established and used for the continuing communication between the two UEs.

If the probing report comprises information that after evaluation indicates that a direct radio communication link should be established between UE 1 and UE 2, UE 1 and UE 2 are provided with instructions on how to set up or switch to the direct radio communication link, alternatively the UEs may be instructed to continue to use the direct radio communication link which was used for the probe signaling message exchange.

Figure 3:
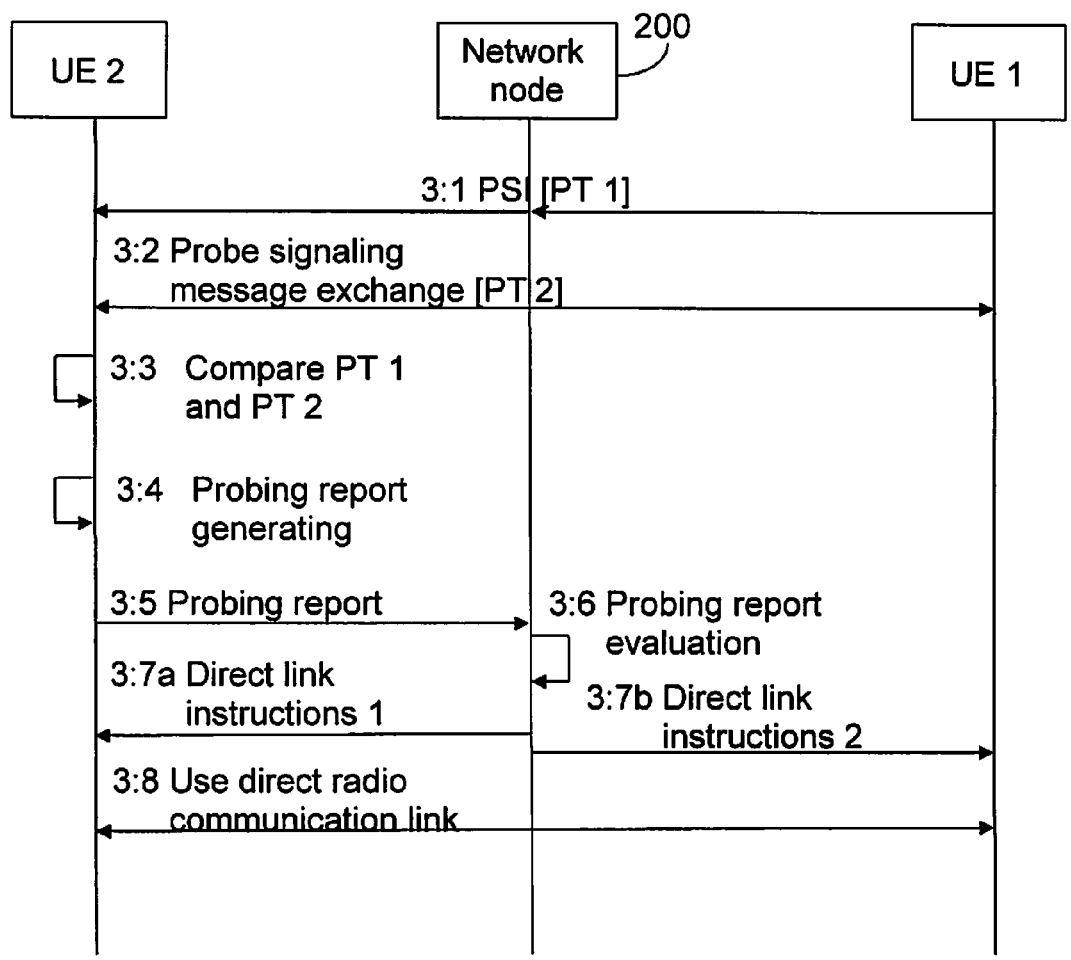
FIG. 3 is another signaling scheme illustrating signaling which enables probing according to a second exemplary embodiment.

FIG. 3 is another signaling diagram which illustrates another example of a particular scenario, where one of the UEs, namely UE 1, is provided with functionality for triggering the suggested probing process instead of network node 200. In a first step 3:1, UE 2 receives probe signaling information, comprising a first probe token, PT 1, from UE 1 via communication network 200. Based on at least parts of the probe signaling information UE1 or UE 2 then starts a probe signaling message exchange procedure, as indicated with another step 3:2. In the present example a probe signaling message transmitted from UE1 to UE2 comprises a second probe token, PT 2. In a subsequent step 3:3, the two probe tokens are tested for relation, e.g. compared at UE 2, and in case the probe tokens are found to be related, radio condition measurements are processed and a probing report is generated by UE 2, as indicated with a subsequent step 3:4, and transmitted to network node 200, as indicated with another step 3:5. At the network node 200, the probing report is evaluated, as indicated in a subsequent step 3:6, and in case of a favorable evaluation, network node 200 provides relevant direct link instructions to UE 1 and UE 2, in step 3:7a and 3:7b, respectively, such that a direct radio communication link can be established between the two UEs, as indicated with a final step 3:8.

Figure 4:
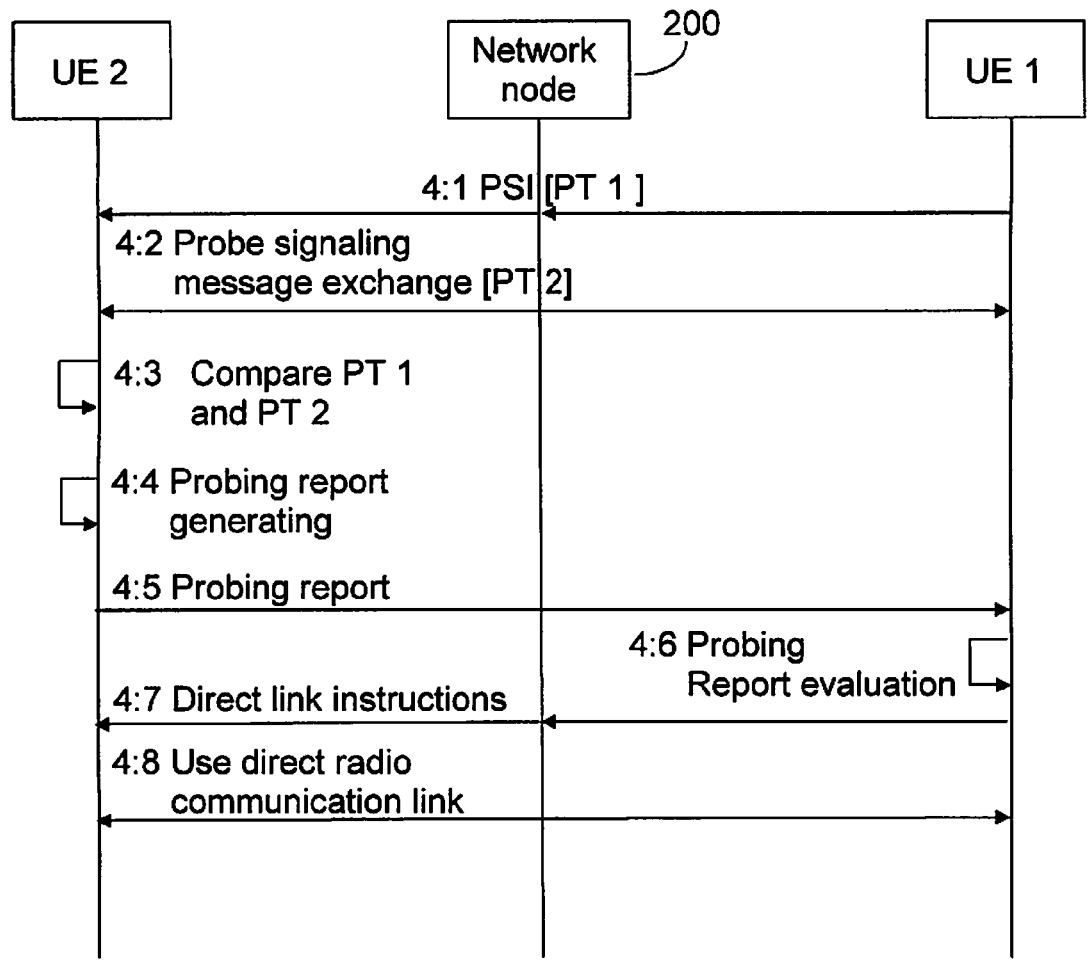
FIG. 4 is yet another signaling scheme illustrating signaling which enables probing according to a third exemplary embodiment.

A third scenario is described with reference to FIG. 4, where the probing process is initiated in a corresponding way to the process of FIG. 3, but where the probing report is sent to UE 1 instead of to the communication network, as indicated in step 4:5. Consequently, UE 1 evaluates the probing report, as indicated in a step 4:6, and in case of a favorable evaluation UE 1 provides instructions for establishing and using a direct radio communication link in its continuing communication with UE 2, to UE 2, as indicated in a next step 4:7.

Figure 5:
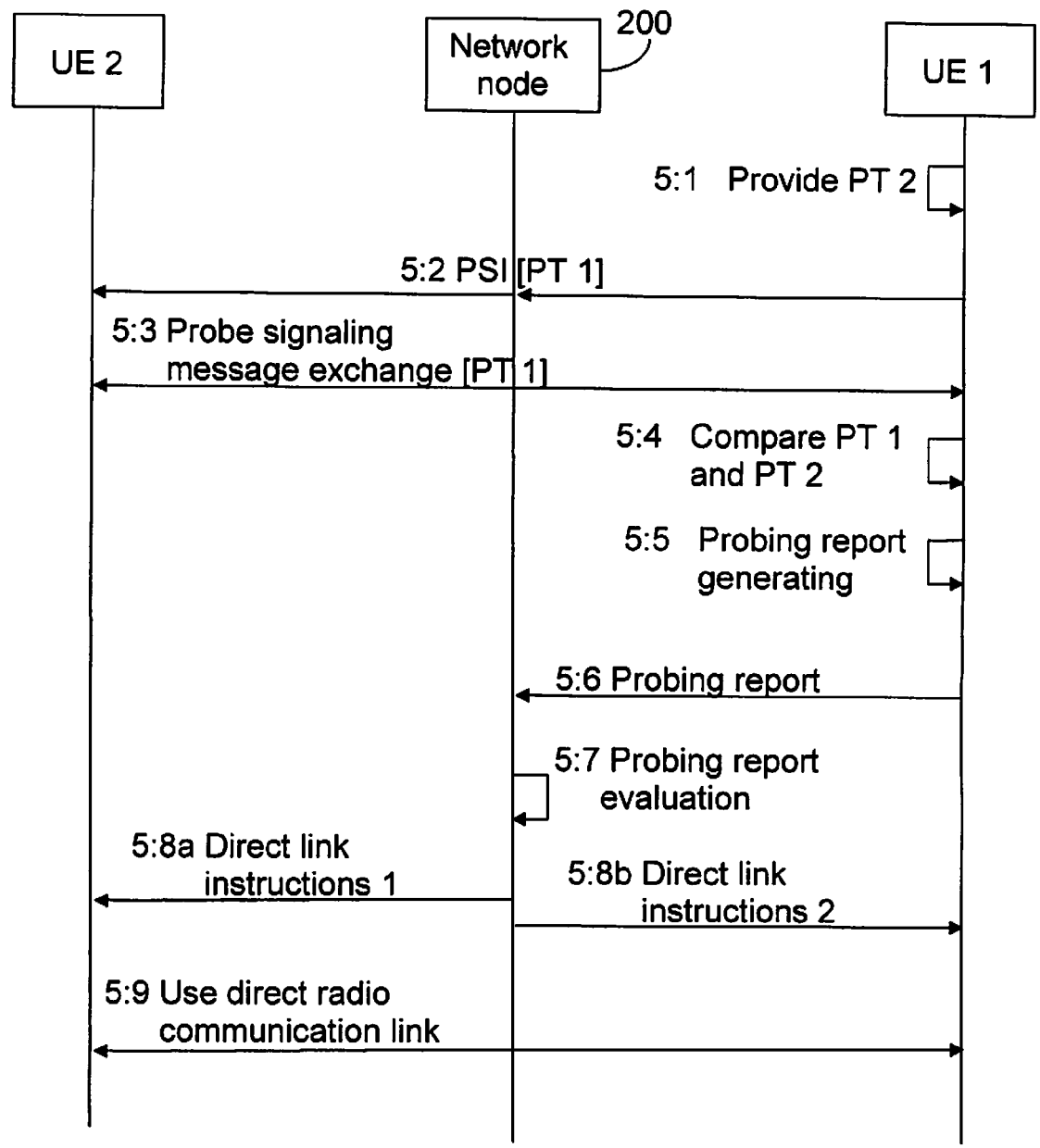
FIG. 5 is another signaling scheme illustrating signaling which enables probing according to a fourth exemplary embodiment.

Yet another scenario is illustrated in FIG. 5, where one of the UEs, namely UE 1, is configured to both initiate the discovery process and to generate the probing report.

In a first step 5:1 UE 1 provides a probe token for later processing by itself, PT 2, and in a subsequent step 5:2 another probe token, PT 1, which is transmitted to UE 2 together with probe signaling information (PSI). In a subsequent step 5:3 probe signaling messages are exchanged between the two UEs, as indicated with another step 5:3. In the present scenario step 5:3 comprises the step of returning PS 1 to UE 1. In a subsequent step 5:4 UE 2 compares the two probe tokens and in case of a successful comparison, UE 1 generates a probing report, as indicated with a step 5:5, and transmits the report, in the present case to the network node 200, as indicated with a subsequent step 5:6. The network node 200 evaluates the probing report in a step 5:7, and in case of a favorable report, network node 200 provides direct link instructions to the first and the second UE, in steps 5:8a and 5:8b, respectively, such that a direct radio communication link can be used for communication between the two UEs, as indicated with step 5:9.

Figure 6:
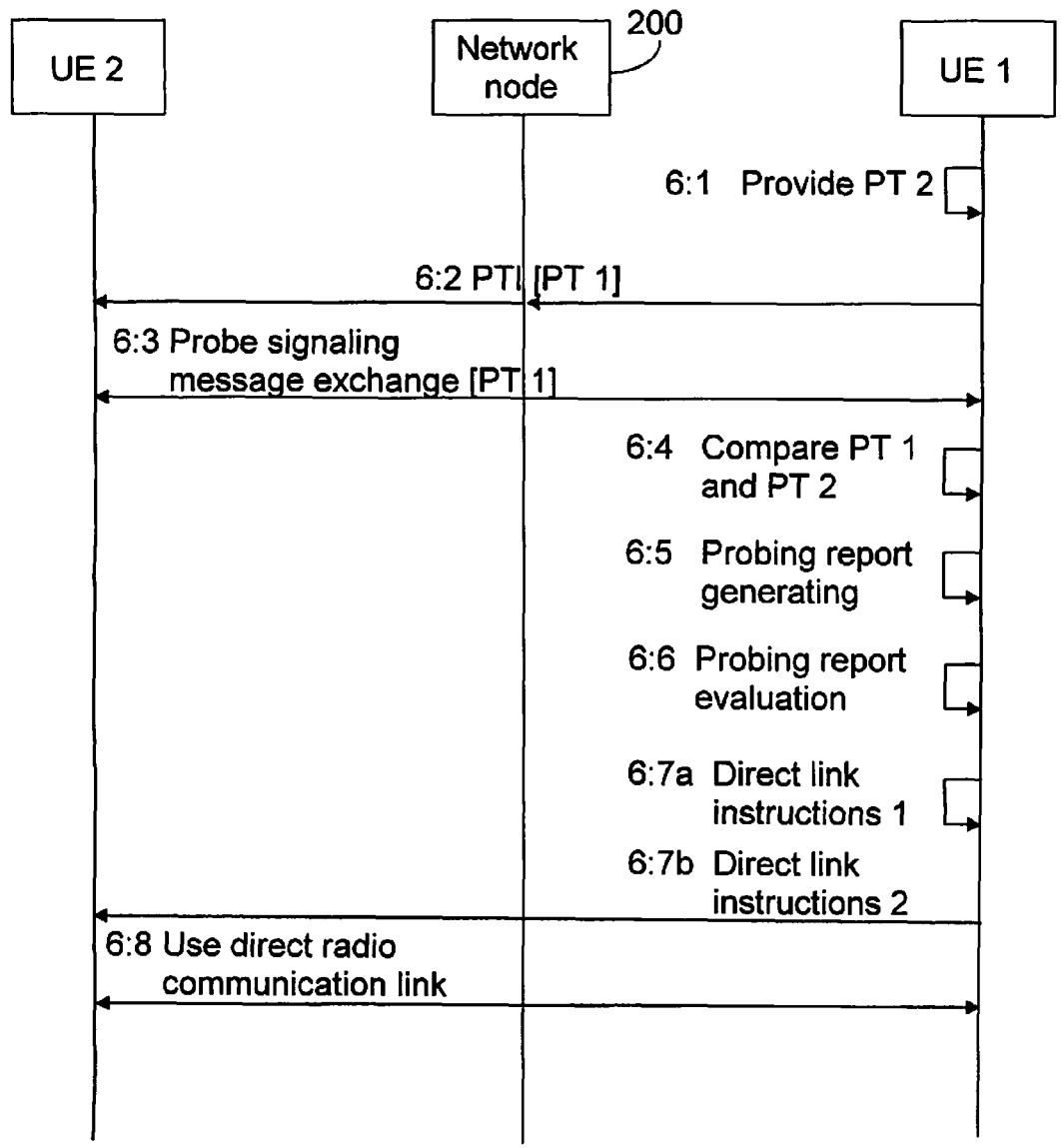
FIG. 6 is yet another signaling scheme illustrating signaling which enables probing according to a third exemplary embodiment.

A variant of the scenario described with reference to FIG. 5, will now be described with reference to FIG. 6, where steps UE 1 is even more involved in the discovery process and where the task of the communication network in this context is to provide a first communication between the two UEs. In the process of FIG. 6 steps 6:1-6:5 correspond to steps 5:1-5:5 of FIG. 5. It is to be understood that in step 6:2 there is no need to involve any network node. After the probing report has been generated, however, UE 1 takes care of the evaluation of the probing report by itself, as indicated in a step 6:6. The evaluation is in this case typically done based on a pre-configuration of UE 1 regarding some set of rules determining criteria for a favorable report. In response to a favorable report, UE 1 generates direct link instructions for itself, as indicated in a step 6:7a and for UE 2, as indicated in another step 6:7b, thereby enabling both UEs to communicate via a direct radio communication link, as indicate in step 6:8.

Figure 7:
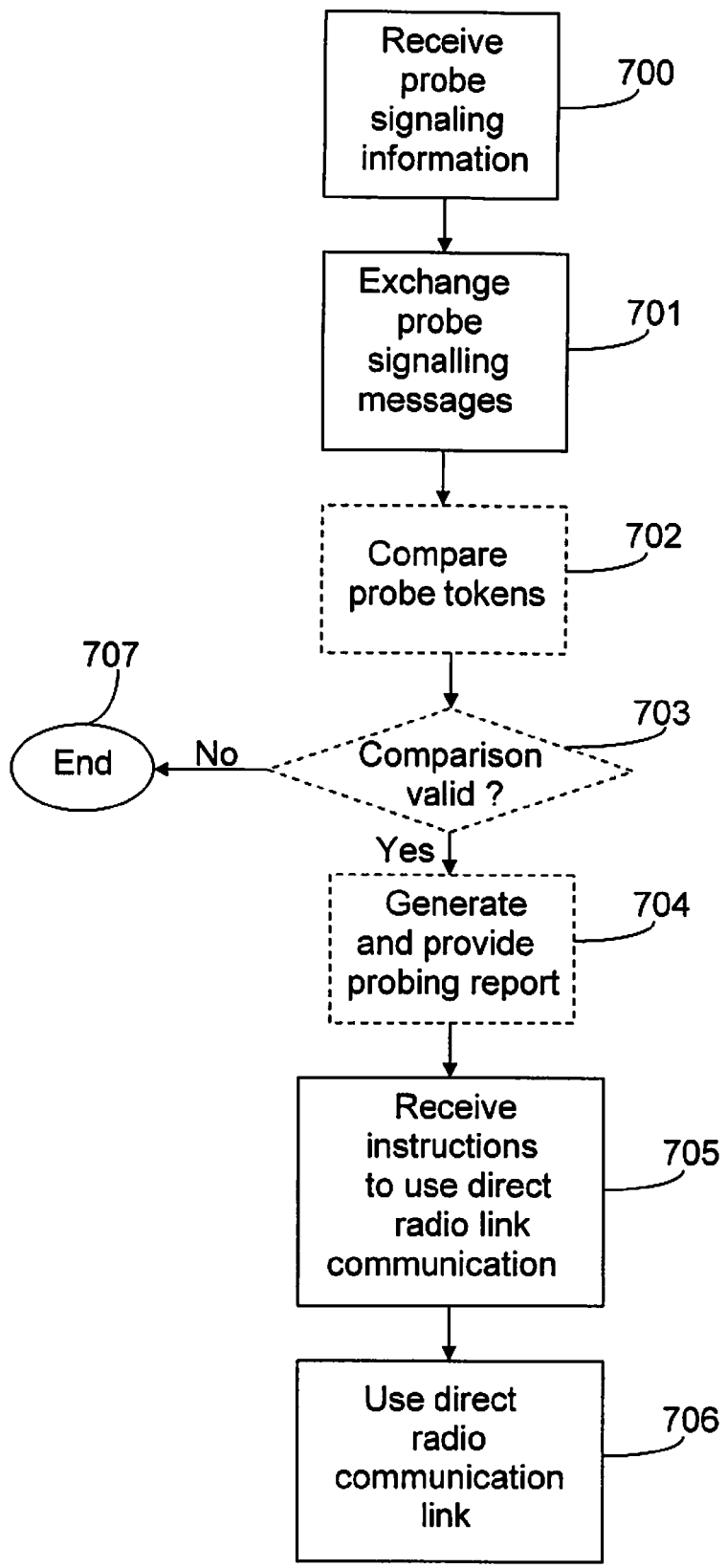
FIG. 7 is a flow chart illustrating a method for executing a probing process at a user equipment according to one exemplary embodiment.

A probing process according to any of the embodiments described above can be realized by executing a suitable method in the entities involved in the process. FIG. 7 is a flow chart illustrating a series of method steps to be executed in a UE which receives probe signaling information from a communication network node or another UE. Consequently the discovery process is initiated by the UE receiving probe signaling information, including a first probe token, as indicated with a first step 700. In a next step 701 probe signaling messages, including a second probe token and/or the first token, are exchanged between the two UEs. More specifically, one or more probe tokens are exchanged, such that one of the UEs or both UEs can compare the two tokens, as indicated in a step 703, and generate and provide the probing report, as indicated with a step 704. If no probing token is received with measurements made according to probe signaling information, the process is instead terminated, as indicated with a step 707. If the evaluation of the probing report is favorable, instructions to use direct radio link communication is provided to the UE, as indicated with step 705, and the link can be used as indicated with step 706. It is to be understood that steps 702 to 704 are steps which rely on the reception of two related probe tokens which can be compared, thereby enabling the UE to identify the other UE. This means that one of the UEs may have a more passive roll, which results in the execution of the steps 700-707 except steps 702 to 704, while the other UE is executing steps 700-707. As already mentioned above, the steps to be executed by the respective UE may depend on instructions available at the respective UEs, instructions provided to the UEs, or a combination thereof.

Figure 8:
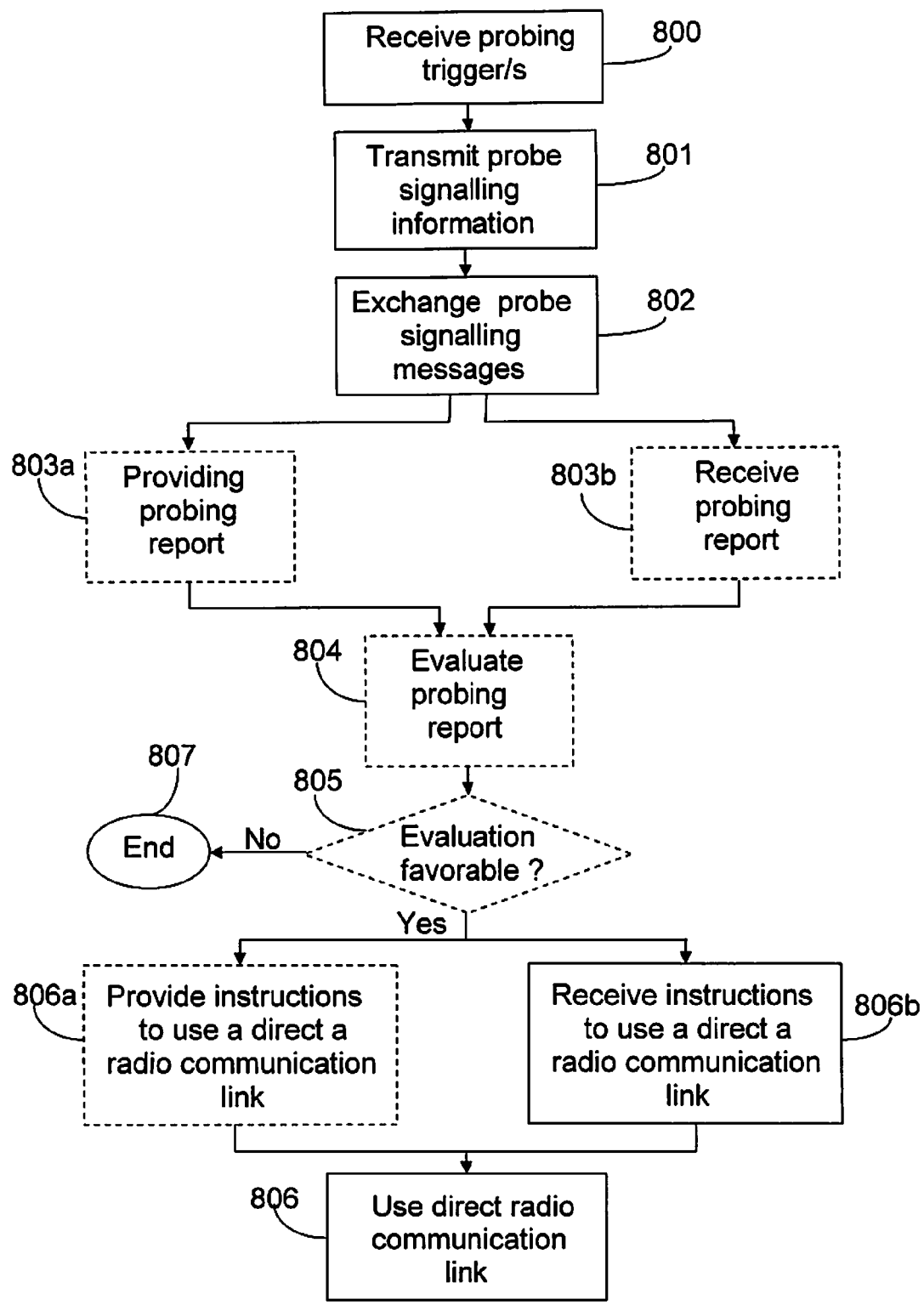
FIG. 8 is another flow chart illustrating a method for initiating and executing a probing process at a user equipment according to one exemplary embodiment.

FIG. 8 is another flow chart illustrating method steps according to one embodiment, which enables a UE to initiate a probing process. As indicated in a first step 800, the method starts by reception of one or more probing triggers from an internal or external trigger source, or a combination thereof. As indicated above, a basic trigger may be an indication that the two UEs are located in close vicinity to each other. In addition, the type of service selected by the users of the UEs may also be considered.

In response to the trigger the UE transmits probe signaling information together with a probe token to the opposite UE, as indicated with a step 801, and in a subsequent step 802, probe signaling messages are exchanged between the two UEs. Subsequent to the probe token exchange the probing report may be provided to the UE itself or to the opposite UE, as indicated in a step 803a, or to the UE from the opposite UE, as indicated in the alternative step 803b. In case of probing report providing according to step 803a, steps which corresponds to steps 702-704 in FIG. 7 will be executed, such that only in case of a successful comparison of probe tokens, a probing report will be provided and made available to one of the UEs.

In a subsequent step, 804, the self-generated or received probing report is evaluated, and in case of a favorable report, which is determined in another step 805, the UE will provide instructions to use a direct radio communication link to the opposite UE, and to itself, as indicated in another step 806a, before the UEs can use the direct radio communication link according to the provided instructions, as indicated in a final step 806. In case the evaluation of the probing report is to be performed by an entity other than the UE executing the method steps described above, the exchange of probe signaling messages according to step 802 will be followed by the reception of instructions to use a direct radio communication link from the entity by which the probing report was evaluated. Such an alternative step is indicated with a step 806*b*. and the report is evaluated in a subsequent step 804*a*.

In order to enable for triggering of the suggested probing process in the communication network, a corresponding method has to be executed in a network node of the communication network. Such a method according to one exemplary embodiment will therefore be described below with reference to the flow chart of FIG. 9, where one or more probing triggers are first received, either internally or from an external triggering source, as indicated with a first step 900, after which probe signaling information is transmitted to the UEs as indicated with a subsequent step 901. In a subsequent step a probing report is received and evaluated, as indicated in a next step 902, and in case of a favorable evaluation, which is determined in a step 903, instructions to use a direct radio communication link are transmitted to one or both UEs, as indicated in a final step 904.

In order for a UE to be able to execute the process described above, it has to be provided with functionality adapted therefore, and thus, in addition of functionality which is normally necessary for providing communication facilities, which will be omitted for simplicity reasons, a plurality of functional units will have to be configured to interact with each other accordingly. Such a UE will now be described with reference to FIG. 10.

Figure 10:
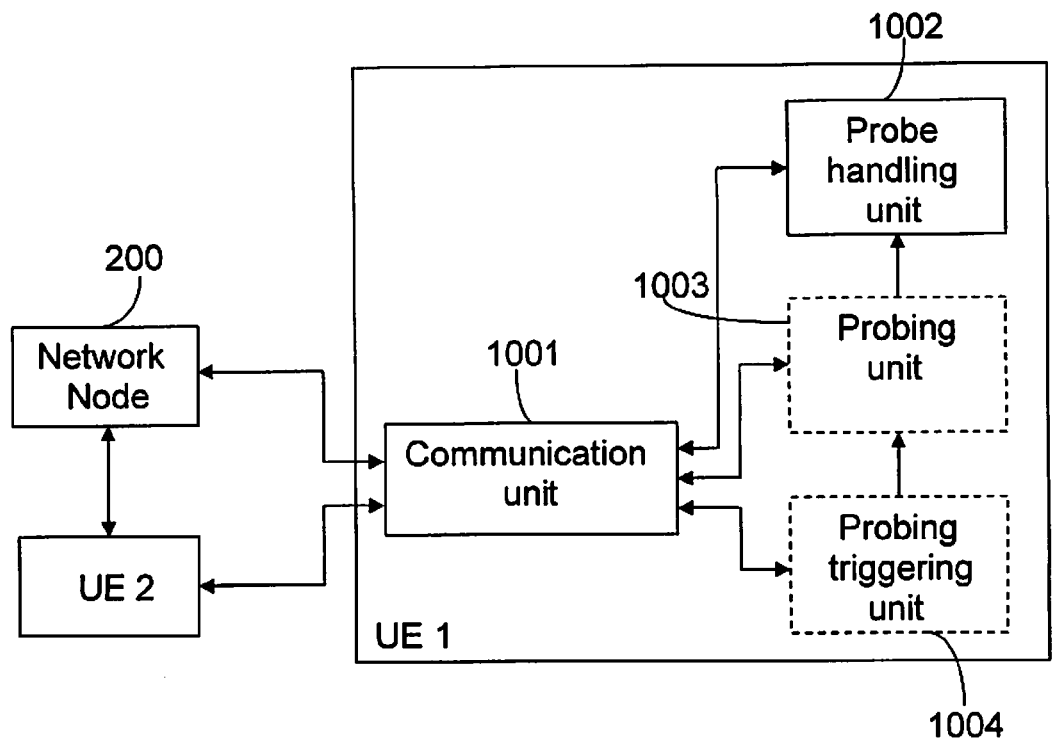
FIG. 10 is a simplified block scheme of a user equipment configured to execute any of the methods described with reference to FIG. 5 or 6.

As indicated in FIG. 10, a first UE, UE 1, is connectable to a second UE, UE 2, as well as to a communication network, wherein in the former case, connection is obtained via a direct radio communication link, while in the latter case, connection involve conventional access nodes (not shown), as well as additional network nodes, here represented by network node 200, which is provided with functionality for participating in the probing process described above.

UE 1 comprises a communication unit 1001 for receiving probe signaling information via the communication network, wherein the probe signaling information initiates the execution of a probing process at UE 1. UE 1 also comprises a unit referred to as a probe handing unit 1002 which is configured to exchange, at least partly according to the acquired probe signaling information, probe signaling messages including the first and/or a second probe token with the second user equipment over a direct radio communication link. By enabling exchange of probe tokens, at least one of the first and the second UEs will be able to identify the opposite user equipment by comparing the first and the second probe token, and thus to determine that the process can continue.

The probe handling unit 1002 is also configured to generate a probing report which, at least partially, is based on content exchanged via probe signaling messages exchanged between the two UEs, and to provide the generated probing report to a node of the communication network, or the second UE UE 2 for evaluation. In addition the communication unit 1001 is further configured to use a second direct radio communication link for communication with the second UE UE 2, according to instructions provided from the entity by which the probing report was evaluated, i.e. from the second UE UE 2 or from network node 200. Alternatively, instructions may be provided by the probe handling unit 1002 of UE 1, in response to a favorable evaluation of a probing report, executed by the probe handling unit 1002.

The probe handling unit 1002 is also configured to compare a first probe token and a second probe token and to generate a probing report in case of a successful comparison.

The first UE UE 1 described above according to one exemplary embodiment is configured to participate in a probing process triggered at a network node 200 or at a second UE UE 2. A UE which is configured to participate in a probing process such as the one of the alternative processes described above may however also be configured to initiate such a probing process. For obtaining such functionality, the first UE UE 1 will have to be adapted accordingly. According to another alternative embodiment, the first UE UE 1 may therefore also be provided with a unit, here referred to as probing unit 1003, which is configured to generate probe signaling information, a first and a second probe token to be used for UE identification, and to provide the probe signaling information and one or both of the generated probe tokens to the second UE UE 2. The probing unit 1003 is configured to transmit the probe signaling information, via communication unit 1001 and the communication network node 200.

In case of a probing initiating UE, the first UE UE 1 may also be provided with functionality for triggering the probing process at the UE. In FIG. 10, such functionality is provided in a unit, referred to as a probing triggering unit 1004. The probing triggering unit 1004 is configured to trigger the communication unit 1001 to transmit probe signaling information to the second UE UE 2, and possibly also to provide corresponding probe signaling information to UE 1 itself when one or more trigger criteria has been fulfilled. The triggering is typically based on data provided from one or more external sources, such as e.g. a distance estimating entity, configured according to any conventional technique, but may also be, at least partially, based on data generated internally by the probing triggering unit 1003. The probing triggering unit 1004 is configured to trigger the transmission of probe signaling information in case it is determined by the probing triggering unit 1004 that all required criteria is fulfilled.

More specifically, the probing triggering unit 1004 may be configured to acquire an estimate of a distance between the first UE UE 1 and the second UE UE 2 and to trigger the transmission of probe signaling information in case the estimated distance is less than a pre-defined maximum distance, typically the transmitting range for the direct radio communication link. The probing unit 1003 may also be configured to repeat the suggested probing process at a certain repetition rate, for ascertaining that the most suitable means of communication is used at all occasions.

In order to perform the probing process described above, one or more network nodes of the common communication network via which the two UEs are initially connected also have to be adapted accordingly. One such network node 200 according to one embodiment will therefore be described in further detail below, with reference to FIG. 11. It is to be understood that although the functionality of the common communication network is provided in one single network node in FIG. 11, the suggested functionality may alternatively be distributed on two or more nodes of, or accessible to the communication network, in addition to network node 200.

Network node 200 comprises a probing unit 1100, a communication unit 1101 and a probing triggering unit 1102 which has functionality which corresponds to the corresponding functionality of the UE described above with reference to FIG. 10. More specifically, probing unit 1100 is configured to transmit a first set of probe signaling information comprising a first probe token to the first UE UE 1 or the second UE UE 2 via communication unit 1101, and a second set of probe signaling information comprising a second probe token to the opposite UE. The probing unit 1100 is also configured to receive and evaluate a probing report transmitted from any of the UEs.

The probing triggering unit 1102 of network node 200 is configured to trigger the communication unit 1101 to transmit probe signaling information to the second and/or first UE when one or more trigger criteria has been fulfilled. In a particular embodiment probing triggering unit 1102 is configured to acquire an estimate on a distance between the first and the second UE and to trigger the probing process by initiating the transmission of probe signaling information in case the estimated distance is less than a pre-defined maximum distance. Furthermore, the probing triggering unit 1102 may be configured to determine whether at least one additional criterion for transmitting probe signaling information to one or both of the first UE 1 and second UE UE 2 is fulfilled and to trigger the transmission of probe signaling information in case all required criteria is fulfilled. As for the UE the probing unit 1100 may be configured to repeat the suggested probing process at a certain repetition rate.

According to an alternative embodiment repeated probing may be applied, where a device initiating a probing process may make available a hash chain of probe tokens to the UEs, according to any conventional mechanism for providing hash chains. In such a scenario the last probe token of a chain may be sent during establishment of a direct radio communication link, wherein for each subsequent, repeated probing process the current last non-disclosed probe token is sent. The receiving UE keeps track of the latest received probe token and compares a corresponding probe token, obtained via a candidate probing message with the last probe token, such that the sending UE can be authenticated.

Figure 12:
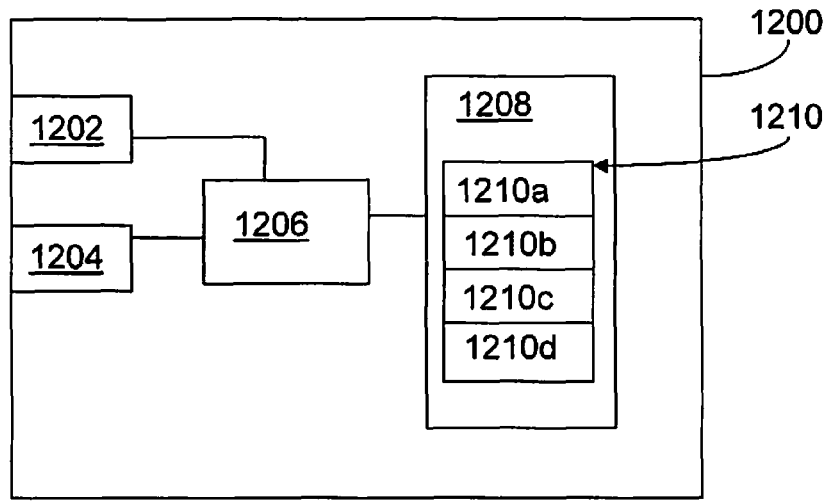
FIG. 12 is a schematic view illustrating a UE, according to an embodiment.

FIG. 12 schematically shows an embodiment of a UE, UE 1, which also can be an alternative way of disclosing an embodiment of the UE, UE 1, illustrated in FIG. 10. Comprised in the UE 1 are here a processing unit 1206, e.g. with a DSP (Digital Signal Processor) and an encoding and a decoding module. The processing unit 1206 can be a single unit or a plurality of units to perform different steps of procedures described herein. The UE 1 1200 also comprises the input unit 1202 for receiving signals, and the output unit 1204 for output signal(s). The input unit 1202 and the output unit 1204 may be arranged as one in the hardware of the UE.

Furthermore the UE 1200 comprises at least one computer program product 1208 in the form of a non-volatile memory, e.g. an EEPROM (Electrically Erasable Programmable Read-Only Memory), a flash memory and a disk drive. The computer program product 1208 comprises a computer program 1210, which comprises code means, which when run in the processing unit 1206 in the UE 1200 causes the UE to perform the steps of the procedures described earlier in conjunction with FIGS. 7 and 8, respectively.

Hence in the exemplary embodiments described, the code means in the computer program 1210 of the UE 1200 comprises a communication module 1210a for receiving probe signaling information, a probe handling module 1210b for exchanging probe signaling messages, a probing module 1210c, for generating and providing probe signaling information, and a probing triggering module 1210d for triggering the probing process at the UE. The computer program 1210 is in the form of computer program code structured in computer program modules. The modules 1210a-d essentially perform the steps of the flows illustrated in FIG. 7 or 8, to emulate the UE illustrated in FIG. 10. In other words, when the different modules 1210a-d are run on the processing unit 1206, they correspond to the units 1001-1004 of FIG. 10.

Figure 11:
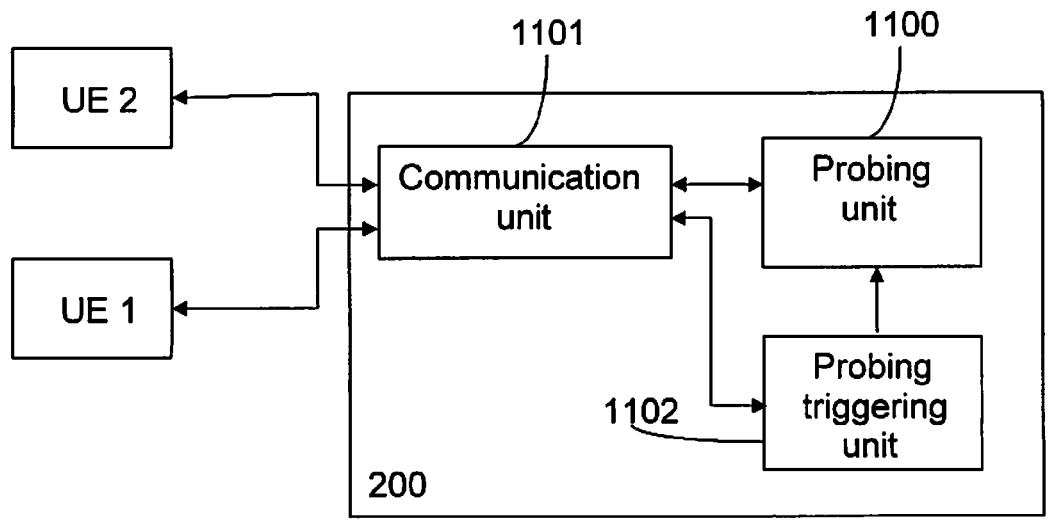
FIG. 11 is a simplified block scheme of a network node configured to execute the method described with reference to FIG. 7.
Figure 13:
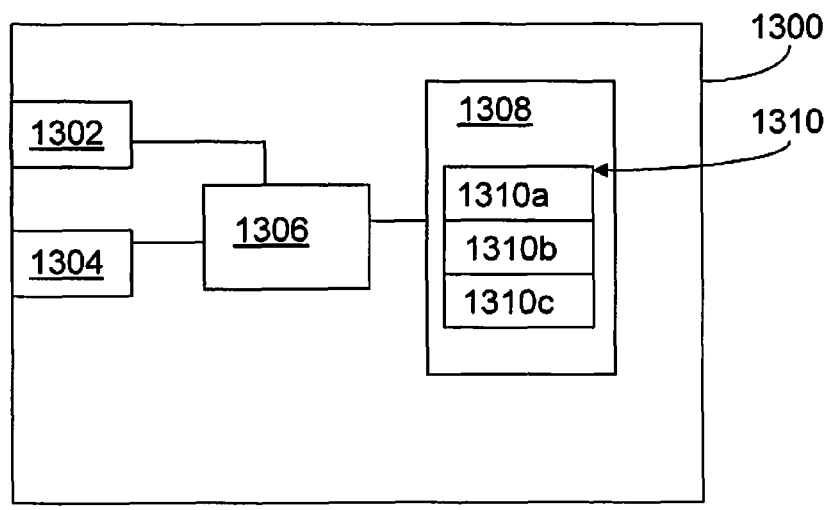
FIG. 13 is a schematic view illustrating a network node, according to an embodiment.

FIG. 13 schematically shows network node 200, which also can be an alternative way of disclosing an embodiment of the network node, illustrated in FIG. 11. Comprised in the network node 200 are here a processing unit 1306, e.g. with a DSP (Digital Signal Processor) and an encoding and a decoding module. The processing unit 1306 can be a single unit or a plurality of units to perform different steps of procedures described herein. The network node 1300 also comprises the input unit 1302 for receiving signals, and the output unit 1304 for output signal(s). The input unit 1302 and the output unit 1304 may be arranged as one in the hardware of the network node.

Furthermore the network node 1300 comprises at least one computer program product 1308 in the form of a non-volatile memory, e.g. an EEPROM (Electrically Erasable Programmable Read-Only Memory), a flash memory and a disk drive. The computer program product 1308 comprises a computer program 1310, which comprises code means, which when run in the processing unit 1306 in the network node 1300 causes the network node to perform the steps of the procedure described earlier in conjunction with FIG. 9.

Hence in the exemplary embodiments described, the code means in the computer program 1310 of the network node 200 comprises a communication module 1310a for exchanging probe signaling messages, a probing module 1310b, for exchanging probe signaling messages, and a probing triggering module 1210c for triggering transmission of probe signaling information to the second and/or first UE when one or more trigger criteria has been fulfilled. The computer program 1310 is in the form of computer program code structured in computer program modules. The modules 1310a-c essentially perform the steps of the flow illustrated in FIG. 9, to emulate the network node illustrated in FIG. 11. In other words, when the different modules 1310a-c are run on the processing unit 1306, they correspond to the units 1100-1102 of FIG. 11.

Although the code means in the embodiments disclosed above in conjunction with FIGS. 12 and 13 are implemented as computer program modules, which when run on the processing unit causes the UE and network node, respectively, to perform the steps described above in the conjunction with figures mentioned above, at least one of the code means may in alternative embodiments be implemented at least partly as hardware circuits.

Further, the functional modules 1200a-d and 1300a-c described above can be implemented as program modules of a computer program comprising code means, which when run by a processor in the UE and network node, respectively, causes these devices to perform the above-described functions and actions. The processor may not only be a single CPU (Central processing unit), but could comprise two or more processing units in the devices. For example, the processor may include general purpose microprocessors, instruction set processors and/or related chips sets and/or special purpose microprocessors such as ASICs (Application Specific Integrated Circuit). The processor may also comprise board memory for caching purposes. The computer program may be carried by a computer program product in the UE or network node, respectively, connected to the processor. The computer program product comprises a computer readable medium on which the computer program is stored. For example, the computer program product may be a flash memory, a RAM (Random-access memory) ROM (Read-Only Memory) or an EEPROM (Electrically Erasable Programmable ROM), and the computer program modules described above could in alternative embodiments be distributed on different computer program products in the form of memories within the UE and network node, respectively.

While the process as suggested above has been described with reference to specific embodiments provided as examples, the description is generally only intended to illustrate the inventive concept and should not be taken as limiting the scope of the suggested methods and arrangements, which are defined by the appended claims. While described in general terms, the methods and arrangements may be applicable for commonly available communication technologies, such as e.g. the IMS technology, when applying the SIP signaling protocol for providing communication network access, while direct radio communication may be provided via one of a plurality of available technologies, such as e.g. WLAN or an LTE direct mode.

It is also to be understood that the choice of interacting units, as well as the naming of the units are only for exemplifying purpose, and UEs and network nodes suitable to execute any of the methods described above may be configured in a plurality of alternative ways in order to be able to execute the suggested process steps.

It should also be noted that the units described in this disclosure are to be regarded as logical entities and not with necessity as separate physical entities.

ABBREVIATION LIST

IMS Internet Protocol Multimedia Subsystem
LTE Long Term Evolution
RAN Radio Access Network
UE User Equipment
WLAN Wireless Local Area Network

The invention claimed is:

1. A method, implemented in a first user equipment connectable to a second user equipment via a communication network or via a first direct radio communication link, of using a second direct radio communication link for communication between the first and second user equipment, the method comprising:
    transmitting, via a network node of the communication network, probe signaling information to the second user equipment, the probe signaling information comprising a first probe token;
    exchanging, according to the probe signaling information, probe signaling messages including at least one of a second and the first probe token with the second user equipment over the first direct radio communication link;
    comparing the first and the second probe token;
    generating a probing report;
    evaluating the probing report or providing the probing report to the network node or a different node of the communication network or to the second user equipment for evaluation in case of a successful comparison; wherein the probing report is based on content exchanged via the probe signaling messages;
    using the second direct radio communication link for communication with the second user equipment in response to obtaining instructions to use the second direct radio communication link from an entity by which the probing report was evaluated.

2. The method of claim 1:
    wherein the first probe token is provided to the second user equipment together with probe signaling information;
    wherein the second probe token is provided to the second user equipment during the probe signaling exchange.

3. The method of claim 1, further comprising:
    providing a second probe token for later processing by the first user equipment;
    receiving the first probe token from the second user equipment;
    comparing the first and the second probe tokens and generating a probing report in case of a successful comparison;
    transmitting the probing report to the network node;
    receiving an instruction from the network node instructing the first user equipment to use the second direct radio communication link for communication with the second user equipment.

4. The method of claim 1, further comprising:
    providing a second probe token for later processing by the first user equipment;
    receiving the first probe token from the second user equipment;
    comparing the first and the second probe tokens and generating a probing report in case of a successful comparison;
    evaluating the probing report and, depending on results of the evaluating, transmitting an instruction to the second user equipment, instructing the second user equipment to use the second direct radio communication link for communication with the first user equipment.

5. The method of claim 1, wherein the probe signaling information comprises instructions for at least one of the first and second user equipment to perform at least one of the following:
    listen for the first or the second probe token;
    transmit the first or the second probe token to the other user equipment according to the probe signaling information;
    transmit at least a part of the signaling information to the other user equipment.

6. The method of claim 1, further comprising:
    receiving a probing report from the second user equipment;
    evaluating the probing report and, depending on results of the evaluating, providing an instruction to the second user equipment instructing the second user equipment to use the second direct radio communication link for communication with the first user equipment.

7. The method of claim 1, further comprising:
    acquiring distance related information giving an estimated distance between the first and the second user equipment; and
    triggering the transmission of the probe signaling information in response to the estimated distance being less than a pre-defined maximum distance.

8. The method of claim 7:
    further comprising determining whether at least one additional criterion for transmitting probe signaling information to one or both of the first and second user equipment is fulfilled; and
    wherein the triggering the transmission of the probe signaling information is further in response to it being determined that the required criterion is fulfilled.

9. The method of claim 8, wherein the at least one additional criterion is dependent on a type of service provided to the first and/or second user equipment.

10. The method of claim 8, wherein the triggering of the probe signaling information is further in response to it being determined that the required criterion is fulfilled during session setup between the first and the second user equipment.

11. The method of claim 8:
wherein the triggering of the probe signaling information is further in response it being determined that required criterion is fulfilled during an ongoing session between the first and the second user equipment via the communication network;
wherein handover from the communication network to the second direct radio communication link is initiated in response to the probing report being favorable.

12. The method of claim 1, wherein the probing report comprises at least one quality measure indicative of the quality of the first direct radio communication link.

13. The method of claim 12, wherein the probing report comprises at least one of:
an indication of signal strength received from the other user equipment by an entity from which the probing report was transmitted;
an indication of power received from the other user equipment by the entity from which the probing report was transmitted;
an estimate of signal to noise ratio experienced by the entity from which the probing report was transmitted;
an indication of interference experienced by the entity from which the probing report was transmitted, and
an estimate of path loss between the user equipment.

14. The method of claim 1, wherein at least one of the probe tokens comprises a randomly or pseudo-randomly generated bit string.

15. The method of claim 1, wherein the radio spectrum of the first and/or second direct communication link is an unlicensed radio spectrum.

16. The method of claim 1, wherein the radio spectrum of the first and/or second direct communication link is a licensed radio spectrum.

17. The method of claim 1, wherein at least part of the probe signaling information is transmitted via an application layer signaling protocol.

18. The method of claim 17, wherein the application layer signaling protocol is the Session Initiation Protocol.

19. The method of claim 1, wherein comparison of the first and second tokens is treated as successful in response to any of the following:
the first probe token is identical to the second token;
the first token is an expected function of the second token;
the second token is an expected function of the first token.

20. The method of claim 1, further comprising repeating the method periodically.

21. A method implemented in a network node of a communication network capable of supporting establishment of a direct radio communication link between a first user equipment and a second user equipment, the method comprising:
transmitting a first set of probe signaling information to one of the first or second user equipment, the first set of probe signaling information comprising a first probe token;
transmitting a second set of probe signaling information to another of the first and second user equipment, the second set of probe signaling information comprising a second probe token;
receiving a probing report from the first or the second user equipment;
evaluating the probing report and, depending on results of the evaluating, transmitting instructions to at least one of the first and the second user equipment instructing that user equipment to use a direct radio communication link for communication with the other user equipment.

22. A method, implemented in a first user equipment connectable to a second user equipment via a communication network or via a first direct radio communication link, of using a second direct radio communication link for communication between the first and the second user equipment, the method comprising:
receiving, via a network node of the communication network, probe signaling information comprising a first probe token;
exchanging, according to the probe signaling information, probe signaling messages including at least one of the first and a second probe token with the second user equipment over the first direct radio communication link;
comparing the first and the second probe token;
generating a probing report; and
evaluating the probing report or providing the probing report to the network node or a different node of the communication network or to the second user equipment for evaluation in case of a successful comparison;
wherein the probing report is based on content exchanged via the probe signaling messages; and
using the second direct radio communication link for communication with the second user equipment in response to receiving instructions to use the second direct radio communication link from an entity by which the probing report was evaluated.

23. A first user equipment connectable to a second user equipment via a communication network or via a first direct radio communication link, the first user equipment comprising:
a communication unit configured to receive, via a network node of the communication network, probe signaling information comprising a first probe token;
a probe handing unit configured to exchange, according to the probe signaling information, probe signaling messages including at least one of a second and the first probe token with the second user equipment over the first direct radio communication link;
wherein the probe handing unit is further configured to:
compare the first and the second probe token;
generate a probing report;
evaluate the probing report or provide the probing report to the network node or a different node of the communication network or to the second user equipment for evaluation in case of a successful comparison;
wherein the probing report is based on content exchanged via the probe signaling messages;
wherein the communication unit is further configured to use a second direct radio communication link for communication with the second user equipment according to instructions provided from an entity by which the probing report was evaluated.

24. The first user equipment of claim 23, wherein the probe handling unit is configured to consider the comparison as successful in response to any of the following:
the first probe token being identical to the second probe token;
the first probe token being derived as an expected function of the second probe token;
the second probe token being derived as an expected function of the first probe token.

25. The first user equipment of claim 23, further comprising a probing unit configured to:
generate the probe signaling information;
provide the generated probe signaling information to the second user equipment.

26. The first user equipment of claim 25, wherein the probing unit is configured to transmit the probe signaling information to the second user equipment via the communication unit and the network node.

27. The first user equipment of claim 26, further comprising a probing triggering unit configured to trigger the probing unit to transmit probe signaling information to the second user equipment via the communication unit when one or more trigger criteria has been fulfilled.

28. The first user equipment of claim 27, wherein the probing triggering unit is configured to:
acquire an estimate of a distance between the first and second user equipment;
trigger the transmission of probe signaling information in response to the estimated distance being less than a pre-defined maximum distance.

29. The first user equipment of claim 28, wherein the probing triggering unit is further configured to:
determine whether at least one additional criterion for transmitting probe signaling information to the second user equipment is fulfilled;
trigger the transmission of probe signaling information in response to it being determined by the probing triggering unit that all required criteria are fulfilled.

30. A network node of a communication network capable of supporting establishment of a direct radio communication link between a first user equipment and a second user equipment, the network node comprising:
a probing unit configured to:
transmit a first set of probe signaling information comprising a first probe token to one of the first and second user equipment;
transmit a second set of probe signaling information comprising a second probe token to another of the first and second user equipment;
receive a probing report from the first or the second user equipment;
evaluate the probing report and, depending on results of the evaluating, transmit instructions to at least one of the first and the second user equipment instructing that user equipment to use a direct radio communication link for communication with the other user equipment.

31. The network node of claim 30, further comprising:
a communication unit operative to transmit to the first and second user equipment;
a probing triggering unit configured to trigger the communication unit to transmit probe signaling information to the first and second user equipment when one or more trigger criteria have been fulfilled.

32. The network node of claim 31:
wherein the probing triggering unit is configured to acquire an estimate of a distance between the first and second user equipment;
trigger the transmission of probe signaling information in response to the estimated distance being less than a maximum distance.

33. The network node of claim 32, wherein the probing triggering unit is configured to:
determine whether at least one additional criterion for transmitting probe signaling information to the first and second user equipment is fulfilled;
trigger the transmission of probe signaling information in response to the required criteria being fulfilled.

34. The network node of claim 33, wherein the probing triggering unit is configured to trigger the probing unit to transmit the probe signaling information periodically.

35. A first user equipment connectable to a second user equipment via a communication network or via a first direct radio communication link, the first user equipment comprising:
a communication unit configured to transmit, via a network node of the communication network, probe signaling information comprising a first probe token;
a probe handing unit configured to exchange, according to the probe signaling information, probe signaling messages including at least one of a second and the first probe token with the second user equipment over the first direct radio communication link; wherein the probe handing unit is further configured to:
compare the first and the second probe token;
generate a probing report;
evaluate the probing report or provide the probing report to the network node or a different node of the communication network or to the second user equipment for evaluation in case of a successful comparison; wherein the probing report is based on content exchanged via the probe signaling messages;
wherein the communication unit is further configured to use a second direct radio communication link for communication with the second user equipment according to instructions provided from an entity by which the probing report was evaluated.

* * * * *

UNITED STATES PATENT AND TRADEMARK OFFICE
CERTIFICATE OF CORRECTION

PATENT NO. : 8,934,892 B2  
APPLICATION NO. : 13/703677  
DATED : January 13, 2015  
INVENTOR(S) : Selander et al.

Page 1 of 1

It is certified that error appears in the above-identified patent and that said Letters Patent is hereby corrected as shown below:

In the drawings

In Fig. 8, Sheet 8 of 11, for Step "806a", in Line 2, delete "a direct a" and insert -- a direct --, therefor.

In Fig. 8, Sheet 8 of 11, for Step "806b", in Line 2, delete "a direct a" and insert -- a direct --, therefor.

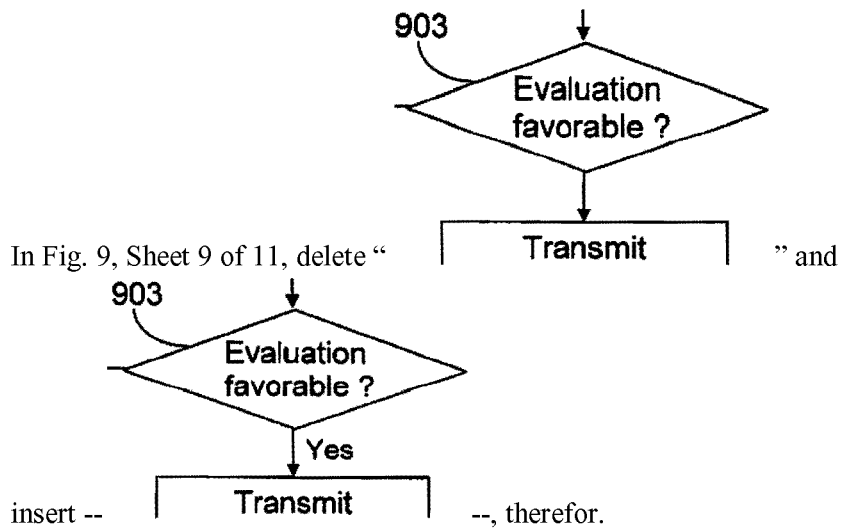

Figure 9:
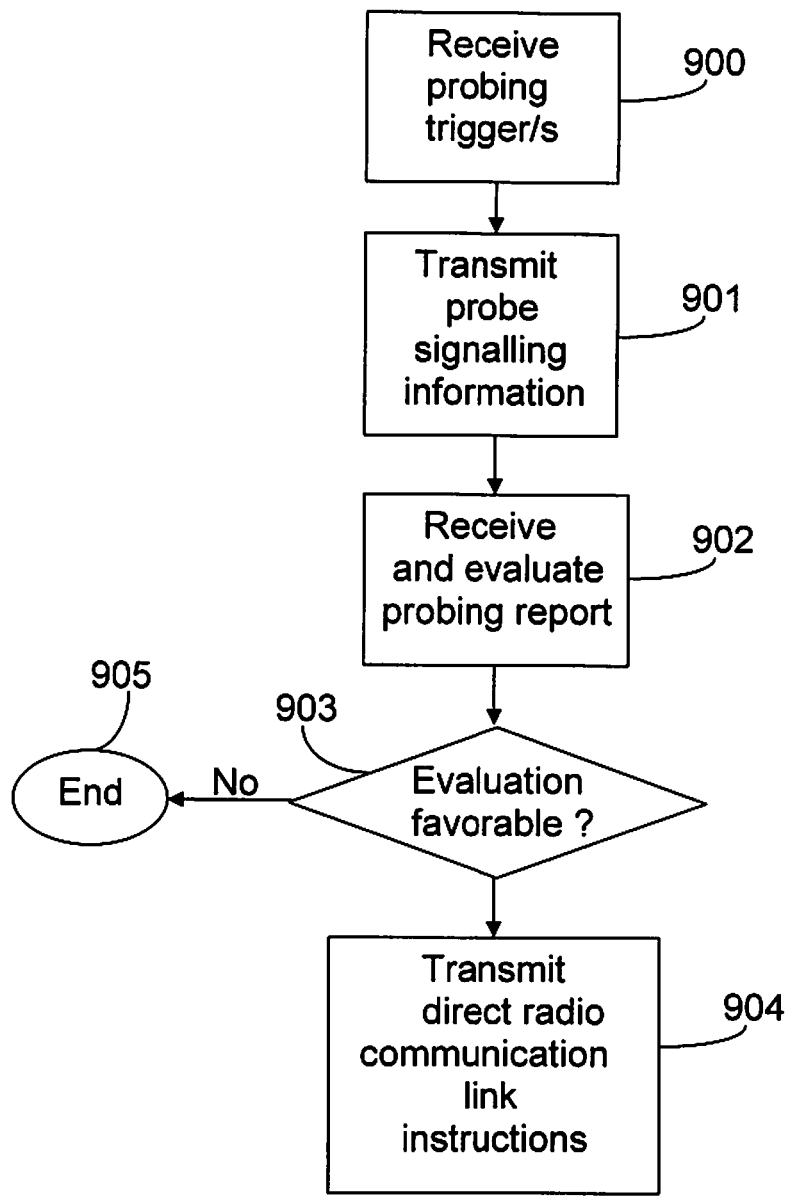
FIG. 9 is yet another flow chart illustrating a method for initiating and executing a probing process at a network node according to one exemplary embodiment.

In Fig. 9, Sheet 9 of 11, delete " " and insert -- --, therefor.

In the specification

In Column 8, Line 10, delete "figure la" and insert -- figure 1a --, therefor.

In Column 14, Line 34, delete "1003." and insert -- 1004. --, therefor.

In Column 16, Line 28, delete "1210c" and insert -- 1310dc --, therefor.

Signed and Sealed this  
Seventeenth Day of November, 2015

Michelle K. Lee  
*Director of the United States Patent and Trademark Office*